US012551196B2

(12) United States Patent
Hsu et al.

(10) Patent No.: US 12,551,196 B2
(45) Date of Patent: Feb. 17, 2026

(54) MEASURING PULSE WAVE VELOCITY USING ULTRASOUND

(71) Applicant: BioProber Corporation, Bellevue, WA (US)

(72) Inventors: Yi Han Hsu, Waterloo (CA); Adrian Jian Yuan Chee, Waterloo (CA); Yat Shun Yiu, Waterloo (CA); Alfred Cheuk Hang Yu, Waterloo (CA)

(73) Assignee: BIOPROBER CORPORATION, Bellevue, WA (US)

( * ) Notice: Subject to any disclaimer, the term of this patent is extended or adjusted under 35 U.S.C. 154(b) by 0 days.

(21) Appl. No.: 18/821,401

(22) Filed: Aug. 30, 2024

(65) Prior Publication Data

US 2025/0312015 A1  Oct. 9, 2025

Related U.S. Application Data

(60) Provisional application No. 63/535,822, filed on Aug. 31, 2023.

(51) Int. Cl.
*A61B 8/00* (2006.01)
*A61B 8/08* (2006.01)
(Continued)

(52) U.S. Cl.
CPC .......... *A61B 8/5276* (2013.01); *A61B 8/0891* (2013.01); *A61B 8/485* (2013.01);
(Continued)

(58) Field of Classification Search
CPC ..... A61B 8/5276; A61B 8/0891; A61B 8/485; A61B 8/5223; G06T 5/70; G06T 7/246; G06T 2207/10132; G06T 2207/30101
See application file for complete search history.

(56) References Cited

PUBLICATIONS

Xu et al. "A Flexible Ultrasound Array for Local Pulse Wave Velocity Monitoring." Biosensors (Basel). Jun. 30, 2022;12(7):479. doi: 10.3390/bios12070479. PMID: 35884282; PMCID: PMC9312981 (Year: 2022).*

(Continued)

*Primary Examiner* — Amelie R Davis
(74) *Attorney, Agent, or Firm* — HAUPTMAN HAM, LLP

(57) ABSTRACT

Pulse wave velocity (PWV) is a measure of arterial stiffness and a cardiovascular disease risk factor. Accurate PWV estimation is difficult due to complex arterial dynamics, such as longitudinal motion and natural tissue oscillations. This present disclosure relates to a robust, motion-resistant PWV estimation framework including: 1) tracking and compensating for arterial longitudinal wall motions, 2) suppressing undulating arterial motion via common mode rejection, and 3) enhancing differential signals to extract wall expansion. In vitro experiments with induced lateral motion indicate the framework's PWV estimates (6.19±0.33 m/s) closely matched reference values (6.26±0.12 m/s; error: 1.1%), outperforming methods without motion compensation (4.46±1.78 m/s; error: 28.8%). In vivo trials with five healthy subjects showed an average PWV of 4.18±0.56 m/s using the motion-resistant method, compared to 2.54±0.95 m/s without motion compensation (p<0.005). This framework enhances PWV estimation reliability, offering clinical potential for better arterial stiffness assessment and cardiovascular risk stratification.

6 Claims, 9 Drawing Sheets

(51) Int. Cl.
*G06T 5/70* (2024.01)
*G06T 7/246* (2017.01)

(52) U.S. Cl.
CPC .............. *A61B 8/5223* (2013.01); *G06T 5/70* (2024.01); *G06T 7/246* (2017.01); *G06T 2207/10132* (2013.01); *G06T 2207/30101* (2013.01)

(56) References Cited

PUBLICATIONS

B. Denarie et al., "Coherent plane wave compounding for very high frame rate ultrasonography of rapidly moving targets," IEEE Trans. Med. Imaging, vol. 32, No. 7, pp. 1265-1276, Jul. 2013; 12 pgs.

B. Pan et al., "Two-dimensional digital image correlation for in-plane displacement and strain measurement: A review," Meas. Sci. Technol., vol. 20, No. 6, Jun. 2009; 17 pgs.

J. Luo, R. X. Li, and E. E. Konofagou, "Pulse wave imaging of the human carotid artery: an in vivo feasibility study," IEEE Trans. Ultrason. Ferroelectr. Freq. Control, vol. 59, No. 1, pp. 174-181, Jan. 2012; 8 pgs.

J. Poree et al., "High-frame-rate echocardiography using coherent compounding with Doppler-based motion-compensation," IEEE Trans. Med. Imaging, vol. 35, No. 7, pp. 1647-1657, Jul. 2016; 11 pgs.

K. L. Gammelmark and J. A. Jensen, "2-D tissue motion compensation of synthetic transmit aperture images," IEEE Trans. Ultrason. Ferroelectr. Freq. Control, vol. 61, No. 4, pp. 594-610, Apr. 2014; 17 pgs.

K. S. Kim et al., "An efficient motion estimation and compensation method for ultrasound synthetic aperture imaging," Ultrason. Imaging, vol. 24, No. 2, pp. 81-99, Apr. 2002; 19 pgs.

L. Nie et al., "High-frame-rate contrast-enhanced echocardiography using diverging waves: 2-D motion estimation and compensation," IEEE Trans. Ultrason. Ferroelectr. Freq. Control, vol. 66, No. 2, pp. 359-371, Feb. 2019; 13 pgs.

P.-C. Li and W.-N. Lee, "An efficient speckle tracking algorithm for ultrasonic imaging," Ultrason. Imaging, vol. 24, No. 4, pp. 215-228, Oct. 2002; 14 pgs.

\* cited by examiner

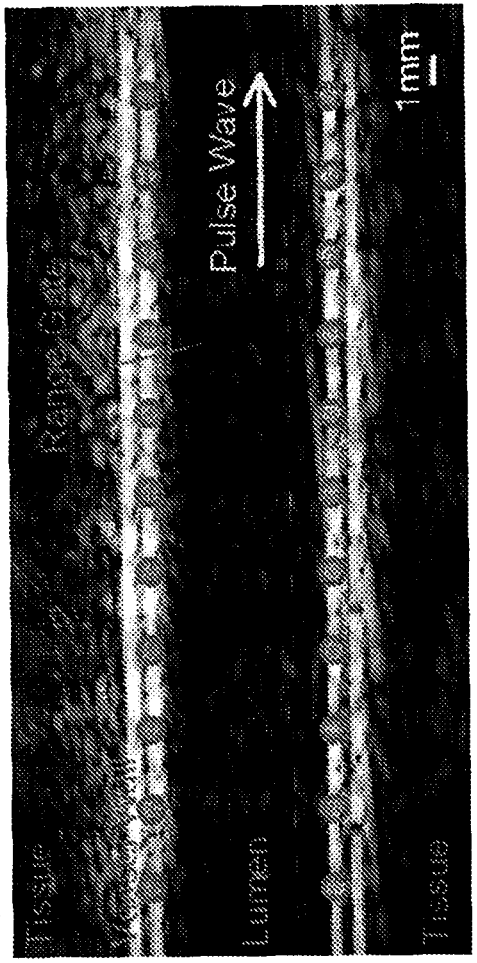
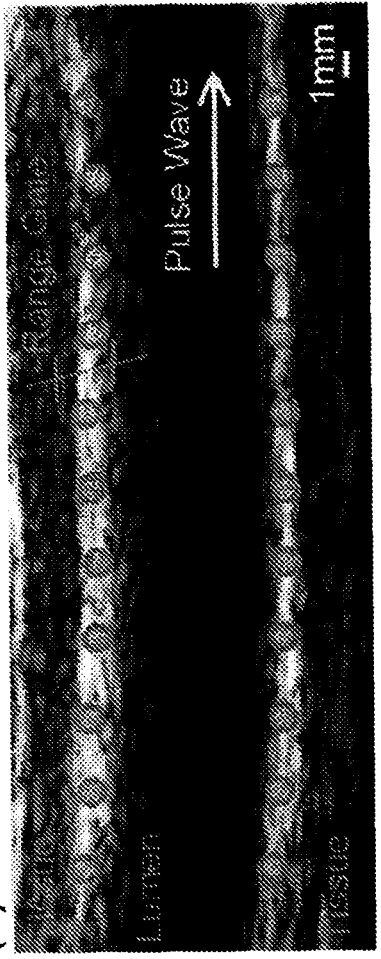
Fig. 4A (a) Reference Pixels for Arterial Phantom
Fig. 4B (b) Reference Pixels for *In Vivo* CCA

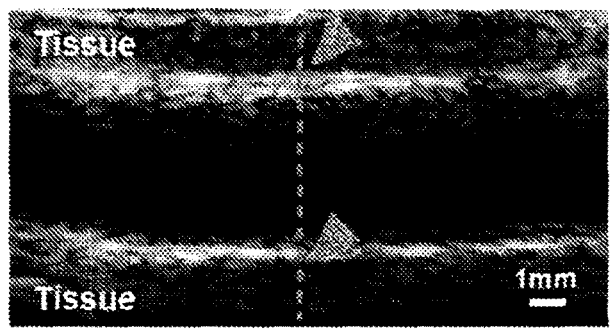
Fig. 6A (a) Velocity Profile
Integration of Velocity Profile to Displacement
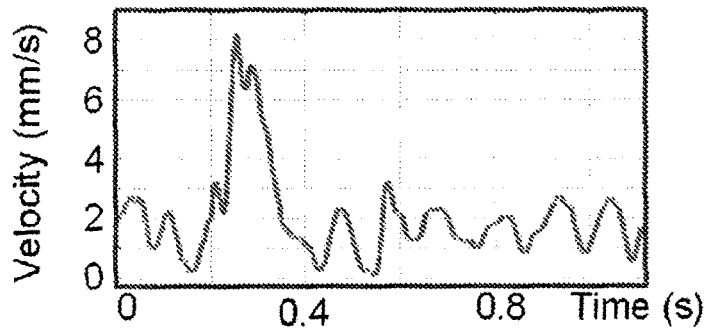
Fig. 6B (b) Displacement Profile
Displacement-to-Pressure Transfer Function
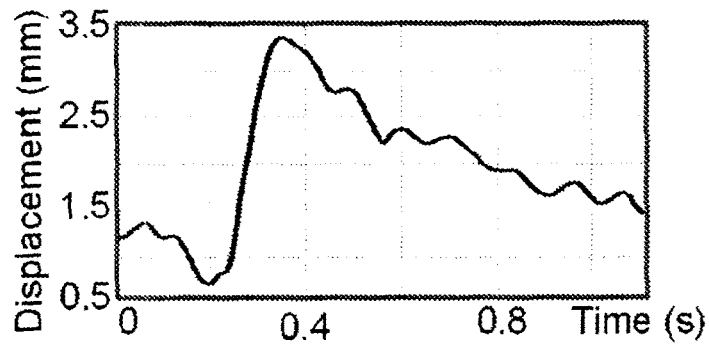
Fig. 6C (c) Pressure Profile
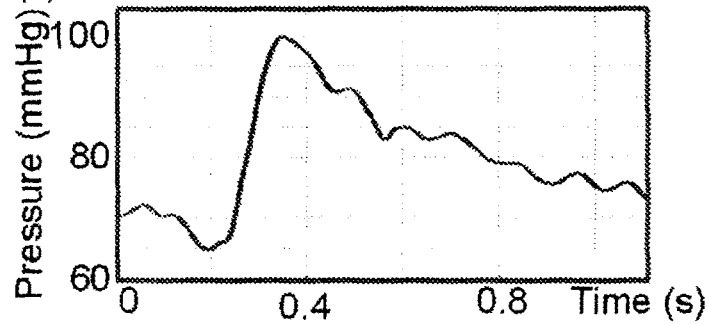

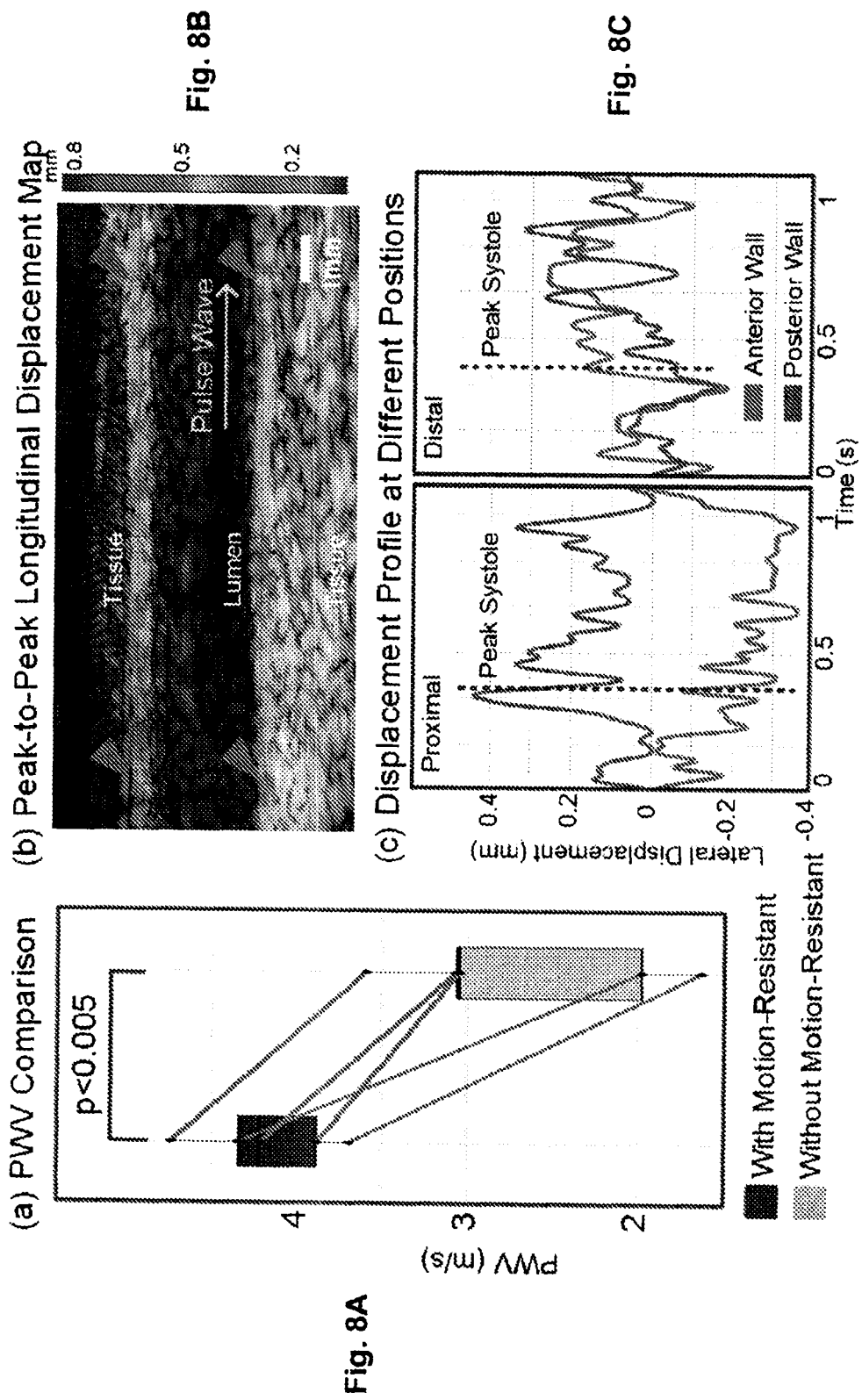

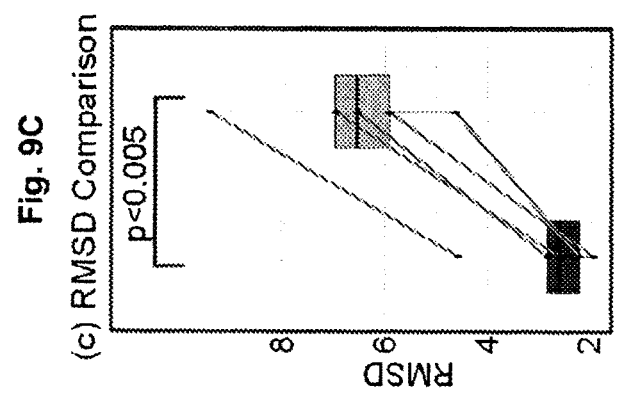
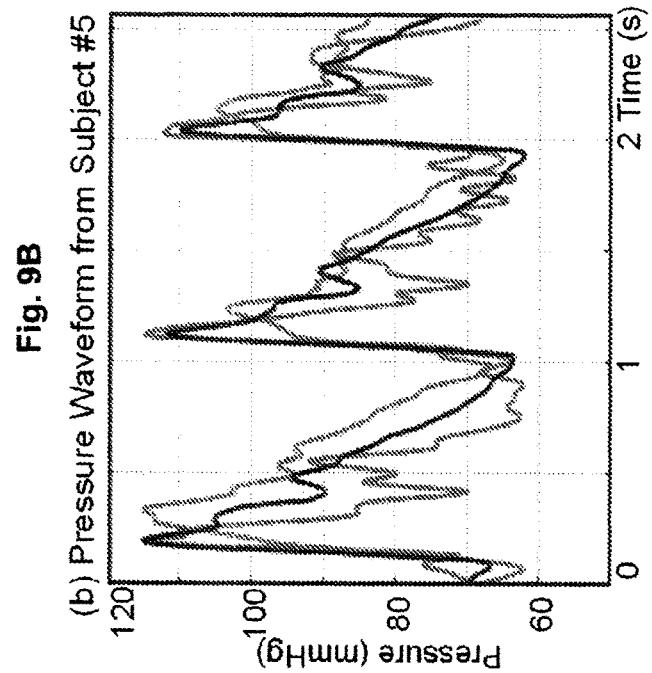
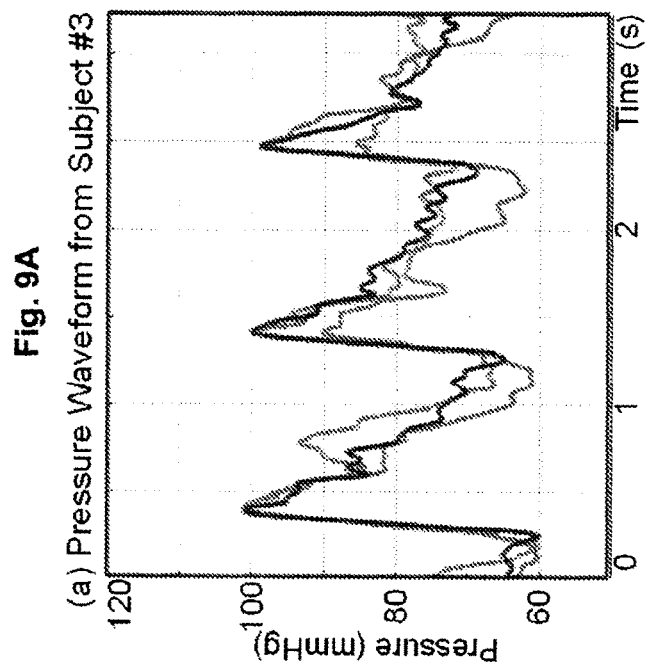

MEASURING PULSE WAVE VELOCITY USING ULTRASOUND

RELATED APPLICATIONS

This application claims priority to U.S. Provisional Patent Application No. 63/535,822, titled "METHOD AND APPARATUS FOR MEASURING PULSE WAVE VELOCITY USING ULTRASOUND" and filed on Aug. 31, 2023, which is incorporated herein by reference in its entirety.

TECHNICAL FIELD

The present disclosure relates to measuring pulse wave velocity using ultrasound.

BACKGROUND

Arterial stiffness is a biomarker for cardiovascular health, which is able to be quantitatively assessed by measuring pulse wave velocity (PWV). PWV is the speed of blood pressure waves travelling through the arteries. An elevated PWV is indicative of increased cardiovascular and cerebrovascular risks associated with pathologies, for example, atherosclerosis, hypertension, and heart ischemia. High-frame-rate ultrasound technologies have enabled the non-invasive assessment of local PWV at segments of arteries (e.g., carotid and aorta), offering greater prognostic value. The adoption of this ultrasound imaging technique has facilitated: large-scale population studies to establish reference values for PWV across various demographic groups, research of the impact of cardiovascular risk factors, and evaluation of arterial of cardiovascular risk factors, as well as evaluation of arterial stiffness in health conditions, for example, diabetes and hypertension. Segmental PWV allows for precise biomechanical properties visualization of the arterial wall to aid cardiovascular risk stratification and monitoring vascular changes in rare genetic conditions, for example, vascular Ehlers-Danlos syndrome, demonstrating this technique's versatility and clinical significance.

Segmental PWV is estimated by tracking arterial wall motion in response to the distension induced by the propagating pulse wave along the arterial network. However, the origins of these wall motions extend beyond the radial expansion caused by the blood pressure upstroke during systole but also include extrinsic vibratory motions due to respiration, cardiac contraction, and vascular tone regulations. Bidirectional intrinsic movements of the arterial wall along the direction of blood flow have been identified. If these wall motions are not properly accounted for, the introduction of artifacts could compromise the accuracy and reliability of the estimated PWV leading to erroneous conclusions and misdiagnosis regarding arterial stiffness and cardiovascular risk. Despite the potential impact, these complexities have not been addressed. As such, more comprehensive methodologies are needed to isolate and suppress these artifacts in PWV measurements.

Motion compensation in ultrasound-based PWV estimation presents a potential solution to effectively suppress undesirable motions, thereby isolating the wall motion profile attributable to pulse wave propagation and enhancing the reliability of PWV measurements. Motion compensation techniques which leverage unfocused transmission schemes with high temporal resolution have been tested in echocardiography applications where addressing high-velocity myocardial tissue motion is of focus. These methods estimate motions using Doppler processing or cross-correlation approaches to track axial or 2-D motions before executing a realignment scheme. Additionally, these strategies have been extended to volumetric ultrasound, generating 3-D velocity fields to assist in motion compensation efforts.

However, the aforementioned techniques have been employed for coherent compounding to enhance B-mode image quality but are not applicable to improve PWV estimation. Another technique which has attempted to suppress motion artifacts in ultrasound-based PWV estimation utilizes subtracting soft tissue displacements from derived vessel wall motions to mitigate extrinsic motions. However, this approach fails to account for longitudinal motion, and thus, new techniques are necessary to effectively suppress motion artifacts to achieve motion-resistant PWV estimates.

SUMMARY

In the present disclosure, a robust, motion-resistant PWV measurement method is able to generate accurate segmental PWV estimates using high-frame-rate ultrasound imaging with local wall dynamics tracking capabilities at sub-millisecond temporal resolution. Motion artifacts during PWV estimation are able to be mitigated by utilizing speckle tracking and tissue Doppler techniques to track, compensate, and suppress motion artifacts originating from propagating pulse waves. The present disclosure has been tested in a well-controlled experimental setup involving an in vitro artery-mimicking model (sometimes referred to as a phantom) with mechanically induced lateral motion, and is able to determine the impacts of longitudinal motion on PWV measurements. An in vivo study on human individuals to examine the feasibility and effectiveness of the new PWV estimation framework is also described throughout the present disclosure.

BRIEF DESCRIPTION OF THE DRAWINGS

Aspects of the present disclosure are best understood from the following detailed description when read with the accompanying figures. It is noted that, in accordance with the practice in the industry, various features are not drawn to scale. In fact, the dimensions of the various features are able to be increased or reduced for clarity of discussion.

FIG. 4A is an image of arterial walls of a model having reference pixels in a search window according to at least one embodiment of the present disclosure.

FIG. 4B is an image of arterial walls (of carotid) in vivo having reference pixels in a search window according to at least one embodiment of the present disclosure.

FIG. 6A-FIG. 6C are graphs of derivation profiles from wall velocity waveforms at the lateral position, FIG. 6A being the corrected profile, FIG. 6B being the displaced profile, and FIG. 6C being the pressure profile according to embodiments of the present disclosure.

FIG. 8A is a graph comparing PWV measurement with and without motion resistance, FIG. 8B is a map indicating lateral displacement detected along the arterial wall, and FIG. 8C is a graph of longitudinal wall displacement at four positions of the arterial wall, according to embodiments of the present disclosure.

FIG. 9A and FIG. 9B are both pressure wave forms derived using the motion-resistant method, without motion-resistant method and reference and acquired from two respective subjects (a) and (b), and FIG. 9C is a graph of RMSD of the pressure waveform from the motion-resistant method versus tonometry compared to RMSD non-motion-resistant method versus tonometry, according to embodiments of the present disclosure.

DETAILED DESCRIPTION

Figure 1:
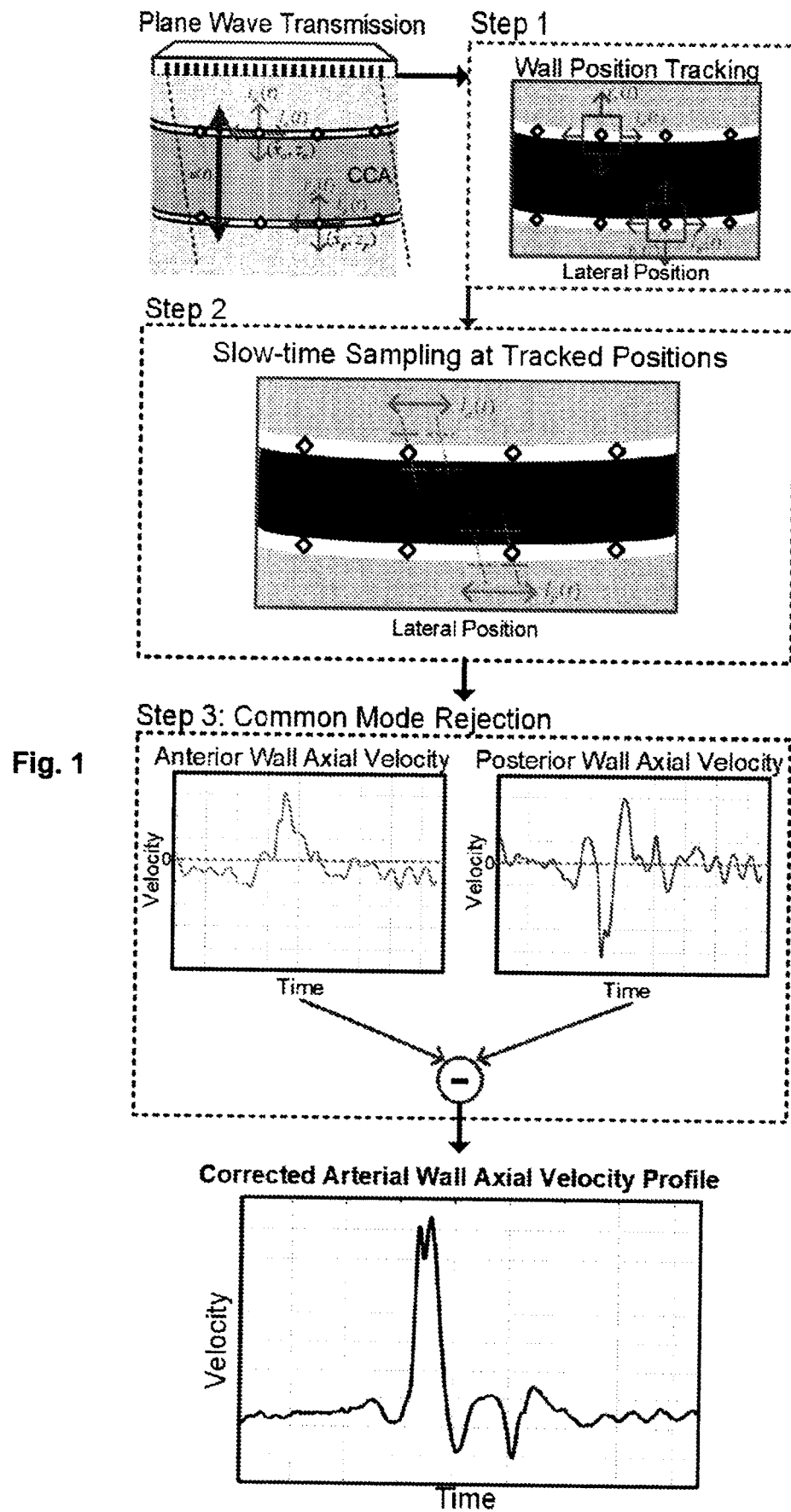
FIG. 1 is a pictorial flowchart/graph of a method of performing correction of an arterial wall axial velocity profile according to at least one embodiment of the present disclosure.

Embodiments described herein describe examples for implementing different features of the provided subject matter. Examples of components, values, operations, materials, arrangements, or the like, are described below to simplify the present disclosure. These are, of course, examples and are not intended to be limiting. Other components, values, operations, materials, arrangements, or the like, are contemplated. For example, the formation of a first feature over or on a second feature in the description that follows include embodiments in which the first and second features are formed in direct contact and include embodiments in which additional features are formed between the first and second features, such that the first and second features are unable to make direct contact. In addition, the present disclosure repeats reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, are used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus is otherwise oriented (rotated 90 degrees or at other orientations) and the spatially relative descriptors used herein likewise are interpreted accordingly.

Terms "system" and "network" in embodiments of this application are used interchangeably. "At least one" means one or more, and "a plurality of" means two or more. The term "and/or" describes an association relationship between associated objects and indicates that three relationships exist. For example, A and/or B indicate the following cases: Only A exists, both A and B exist, and only B exists, where A and B is singular or plural. The character "/" indicates an "or" relationship between the associated objects. "At least one of" or a similar expression thereof means any combination of items, including any combination of singular items (pieces) or plural items (pieces). For example, "at least one of A, B, and C" includes A, B, C, AB, AC, BC, or ABC, and "at least one of A, B, or C" includes A, B, C, A and B, A and C, B and C, or A and B and C.

FIG. 1 is a flowchart/graph pictorial of a method of performing correction of an arterial wall axial velocity profile according to an embodiment of the present disclosure.

In the present disclosure, high-frame-rate ultrasound imaging is utilized to estimate segmental PWV by tracking the progressive radial expansion of the artery induced during pulse wave propagation, upon compensating for lateral wall motions and suppressing the undulating arterial motion. For given positions on the anterior and posterior wall, artery pixel positions at the reference frame at the initial time, t=0, the coordinates of the pixel are as follows:

$$\text{Anterior wall: } (x_a, z_a; t = 0) = [x(0), z_a(0)]$$
$$\text{Posterior wall: } (x_p, z_p; t = 0) = [x(0), z_p(0)]$$

The x and z denote the lateral and axial pixel coordinates, respectively, while subscripts a and p describe the anterior-posterior positions of the arterial wall. The initial positions for these pixels are able to be selected at the same lateral positions, i.e., $x_a(0)=x_p(0)=x(0)$. During a cardiac cycle, the induced motions are attributable to shifts in the initial pixel positions within the image frame. These displacements in the anterior ($s_a$) and posterior ($s_p$) pixels are defined as:

$$s_a(x_a, z_a; t) = s[x_0 + l_a(t), z_a - r_a(t) + u(t)]$$
$$s_p(x_p, z_p; t) = s[x_0 + l_p(t), z_p + r_p(t) + u(t)]$$

The $l(t)$ represents the longitudinal wall movement on either wall, $r(t)$ is the displacement induced by arterial expansion, and $u(t)$ is the undulating motion due to arterial oscillation. The $r(t)$ for the anterior and posterior walls has opposite polarities due to the expansive nature of the wall, moving the walls in opposite directions. In contrast, both walls share the same undulating motion $u(t)$, meaning both walls move axially in the same direction with the same magnitude.

To achieve motion-resistant PWV estimation in the present disclosure, $l(t)$ and $u(t)$ are able to be suppressed while extracting $r(t)$ from the detected motion at each lateral position of the arterial wall. In FIG. 1, the method is applied to the successive beamformed image frames and includes the following three elements: 1) tracking of longitudinal motions $l(t)$ on the vessel walls via 2D speckle tracking algorithm and resampling of slow-time signals; 2) suppression of undulating arterial motion $u(t)$ via common mode rejection, and 3) enhancement of a differential signal to extract a wall expansion signal, $r(t)$, due to PWV. In the end, the segmental PWV is able to be estimated based on the motion-resistant axial wall velocity profile at each lateral pixel position. To increase the motion-resistant method's accuracy, the image frames are able to be beamformed with dense sampling to enhance pixel resolution. The tracking of longitudinal motions, resampling of slow-time signals, suppression of undulating arterial motion, and enhancement of a differential signal are discussed further below in the present disclosure.

The tracking of longitudinal motions is described according to the present disclosure. As shown in FIG. 1, the algorithm begins by tracking the multiphasic and bidirectional longitudinal displacements of the anterior $l_a(t)$ and posterior $l_p(t)$ arterial walls over a cardiac cycle. First, the anterior and posterior vessel walls are mapped in the imaging view as two lateral lines on the beamformed image. The vessel wall is delineated as the most hyperechoic pixel interfacing with the lumen at each lateral position in the end-diastolic frame. In at least one embodiment of the present disclosure, the delineation of the vessel wall is able to be manually performed. For each of these pixels, the respective displacements in lateral, $l(t)$ and axial, $h(t)$ directions are able to be dynamically tracked over successive frames via a 2D cross-correlation-based speckle tracking algorithm which estimates the inter-frame displacements; $h(t)$ is the sum of $r(t)$ and $u(t)$.

For initialization, a reference kernel centered on the wall coordinate is also defined. The position of this reference kernel in subsequent frames is determined based on the closest or optimal 2D cross-correlation match within a defined search window. In each successive frame, the speckle tracking algorithm estimates displacements relative to the reference frame to minimize cumulative errors able to arise from frame-to-frame tracking. To enhance computational efficiency, 2D cross-correlation on a subset of sparsely sampled pixels is utilized rather than on an entirety of pixels. Displacement tracking is performed with a comparatively larger temporal period by skipping intermediate frames. These approaches significantly reduce the computational load and expedite the processing time without compromising the accuracy of the displacement measurements. To recover the unsampled pixels, 2D linear interpolation is performed in the spatial-temporal domain to obtain a continuous representation of the displacement fields of $l(t)$ and $h(t)$.

Figure 2:
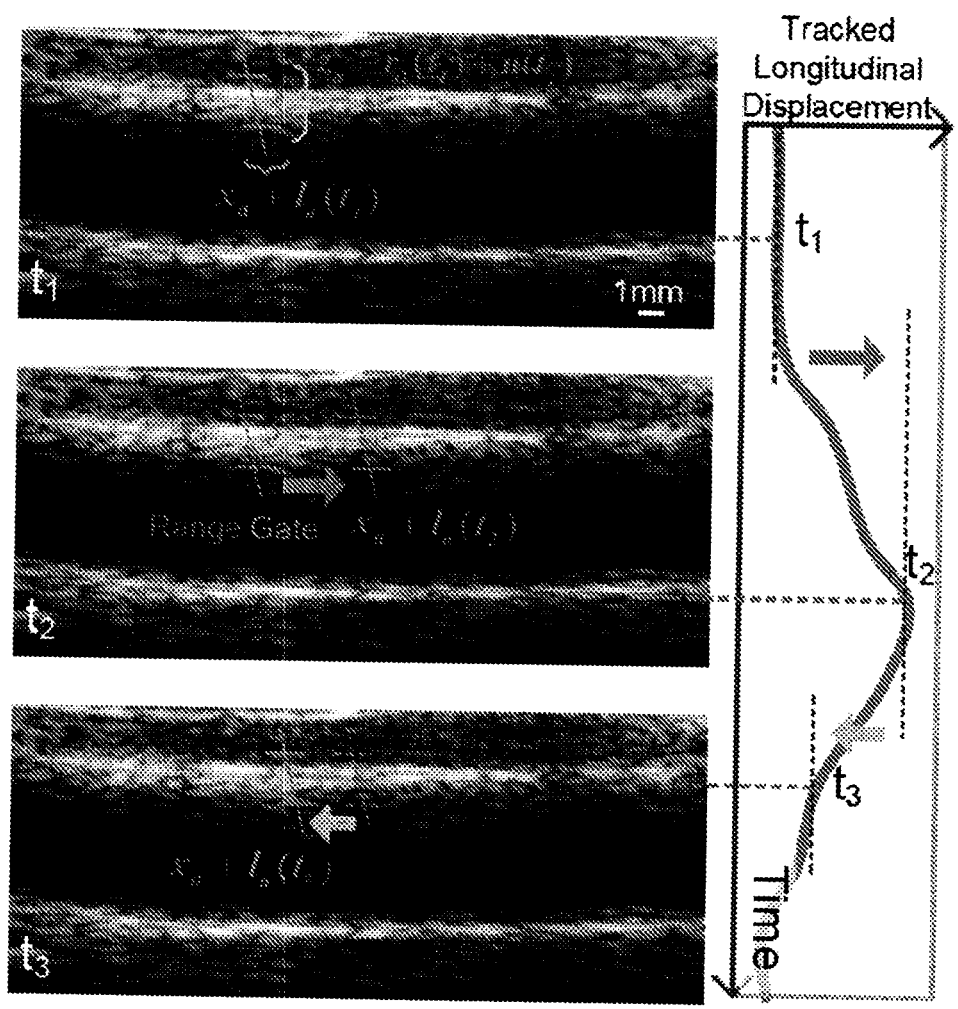
FIG. 2 is a graph pictorial of an anterior arterial wall showing sampling of longitudinal motion compensation of time signals according to at least one embodiment of the present disclosure.

FIG. 2 is a graph pictorial of an anterior arterial wall showing sampling of longitudinal motion compensation of time signals according to an embodiment of the present disclosure.

The resampling of slow-time signals/motion compensation via dynamic slow-time signal sampling is described according to the present disclosure. With the wall displacement estimates, the wall axial velocity is able to be derived via algorithm using a phase-based estimator at the updated positions of the vessel wall to compensate for the tracked lateral motion, $l(t)$, as shown in FIG. 2. Instantaneous axial wall velocities are able to be calculated by applying a lag-one autocorrelation phase estimation algorithm to temporal segments of the slow-time signals sampled at respective dynamically updated lateral positions, i.e., $[x_0+l(t), z]$. This method is able to be extended to include pixels located above and below the delineated vessel line within the range gate; the size of the range gate is determined based on the magnitude of the axial displacement, $h(t)$, from earlier. For each lateral position on either wall, the median velocity within the range gate is determined to represent the axial wall velocity, resulting in a time series of the wall velocity: Anterior Wall Axial Velocity:

$$v_{z_a}(t) = \frac{\partial s_a(x_a, z_a, t)}{\partial t} = -\frac{\partial r_a(t)}{\partial t} + \frac{\partial u_a(t)}{\partial t}$$

Posterior Wall Axial Velocity:

$$v_{z_p}(t) = \frac{\partial s_p(x_p, z_p, t)}{\partial t} = -\frac{\partial r_p(t)}{\partial t} + \frac{\partial u_p(t)}{\partial t}$$

The suppression of undulating arterial motion and isolation of arterial expansion signal is described according to the present disclosure.

The suppression of the undulating arterial motion, $u(t)$, and enhancing of the wall expansion signal, $r(t)$, is achievable by performing a common-mode rejection scheme on the axial wall velocities along the blood vessel. For a respective lateral position, the axial velocity at the anterior wall is subtracted from the respective lateral position at the posterior wall, as shown in the formula below. This approach suppresses common motion patterns in the undulating arterial motion while enhancing the differential signal due to the opposite directional movements of the walls during expansion.

$$v_z(t) = v_{z_p}(t) - v_{z_a}(t) = 2\frac{\partial r_a(t)}{\partial t}$$

During the final step of PWV derivation from corrected velocity profiles, the algorithm derives the PWV using the motion-compensated wall velocity profile at different wall positions. The pulse arrival time is first determined at each lateral position by identifying the time at which the pulse wavefront emerged in the corresponding motion-compensated wall velocity profile. The pulse wavefront is identified as the rising edge of the systolic wave, determined by the intersection of the extrapolated line of the velocity curve during: 1) early systole, and 2) end-diastole of the previous cardiac cycle. Once the pulse arrival time for all wall positions has been determined, the PWV is estimated as the slope of the linear regression between the positions of the pulse wavefront and the respective arrival times thereof.

To test the performance of the motion-compensated PWV estimation of the present disclosure, imaging hardware/equipment, such as an ultrasound research scanner, e.g., US4R; us4 us, equipped with a linear array, e.g., L14-5; Analogic Ultrasound, is able to be configured to achieve high-frame-rate acquisition of pulse wave propagation in arteries. In at least one embodiment of the present disclosure, 5 MHz and 3-cycle pulse plane waves, steered to 10-degree angle, are able to be transmitted to insonify the region of interest. In at least one embodiment of the present disclosure, the pulse repetition frequency (PRF) of the plane wave is set to 3 kHz; image acquisition is performed in 5 s. Retrospective channel domain raw radiofrequency (RF) data is able to be saved and streamed offline to MATLAB, or other similar application, for data processing. The imaging parameters for data acquisition are summarized in Table I below:

TABLE I

IMAGING PARAMETERS USED FOR DATA ACQUISITION AND BEAMFORMING

| Parameter | Value |
| --- | --- |
| Data acquisition | |
| Imaging frequency | 5 MHz |
| Number of pulse cycles | 3 |
| Transit steering angle | 10° |

TABLE I-continued

IMAGING PARAMETERS USED FOR DATA ACQUISITION AND BEAMFORMING

| Parameter | Value |
| --- | --- |
| Pulse repetition frequency | 3 kHz |
| Data acquisition duration | 1 s (in vitro); 5 s (in vivo) |
| Beamforming | |
| Prefiltering | 3-7 MHz bandpass, 30 tap finite impulse response |
| Receive angle | 0° |
| Receive apodization | Hanning |
| Resolution | 401 × 701 |
| Depth range | 0-3 cm |
| Lateral range | −2.0-2.0 cm |

Figure 3:
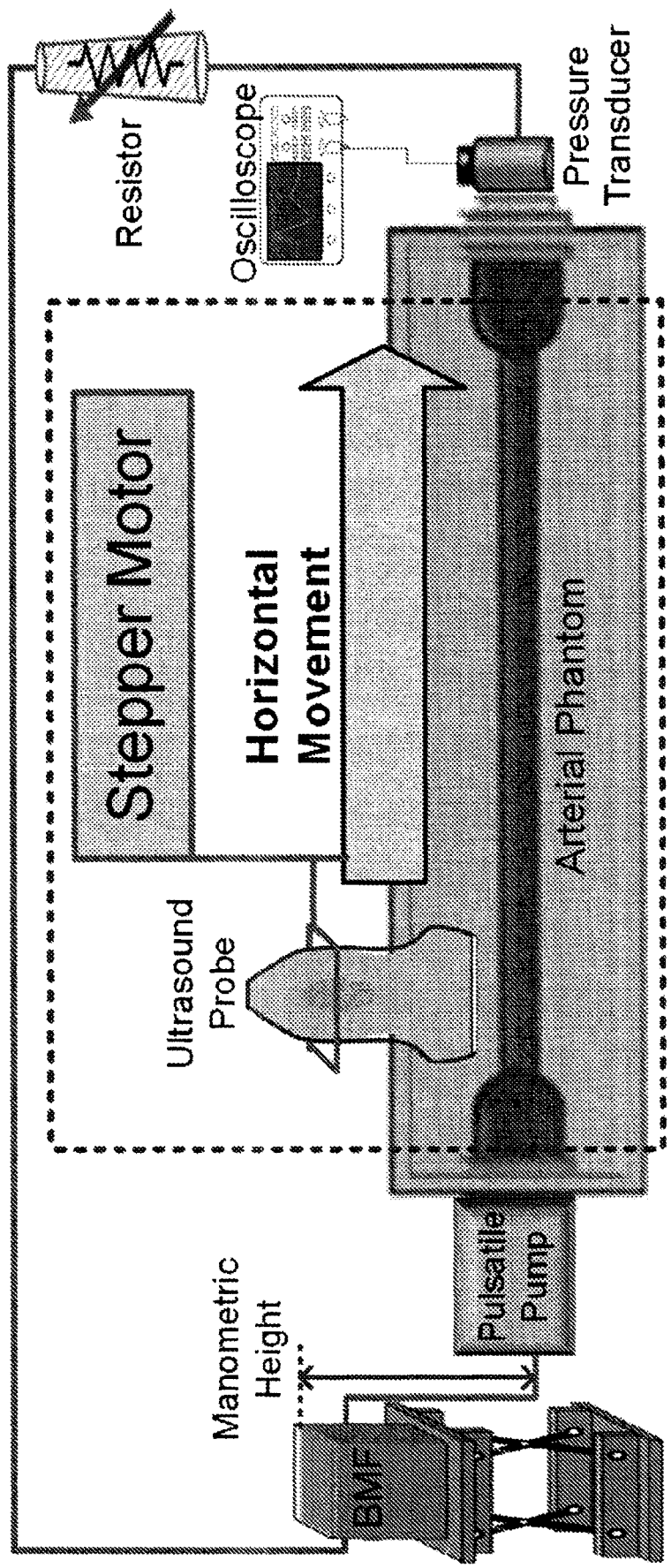
FIG. 3 is a schematic diagram of an experimental setup for evaluation of the method using an in vitro arterial model according to at least one embodiment of the present disclosure.

FIG. 3 is a schematic diagram of an experimental setup for evaluation of the method disclosed herein using an in vitro arterial model according to an embodiment of the present disclosure.

In at least one embodiment of the present disclosure, an in vitro model is able to be utilized to determine i) the impact of the longitudinal motion on the segmental PWV and ii) the efficacy of the motion-resistant method on the compensation of longitudinal movement. In the in vitro model, as shown in FIG. 3, an arterial model (or phantom) is able to replicate the human carotid artery, and longitudinal motions are able to be induced by moving the ultrasound probe to simulate the longitudinal movements. In the present disclosure, the ultrasound probe is longitudinally moved by a programmable stepper motor while high-frame-rate ultrasound acquisition is performed. In the present disclosure, the model assesses the performance and accuracy of the motion-resistant PWV estimation method under controlled conditions, simulating realistic arterial dynamics.

In at least one embodiment of the present disclosure, the arterial model is connected to a flow circuit including a pulsatile blood pump, e.g., 55-3305, Harvard Apparatus, which circulates the blood mimic fluid (BMF) throughout the entire flow circuit, an external BMF reservoir, which supplies to the flow pump, an inline pressure gauge and a downstream flow resistor. The arterial model is a polyvinyl alcohol (PVA)-based straight tube with inner diameter and thickness able to be fabricated to 6 mm and 1.5 mm, respectively, to mimic the carotid artery. In at least one embodiment of the present disclosure, the arterial model is able to be pre-stretched 10% in length to mount onto a 3D-printed customized box (310×70×60 mm$^3$) having quick-fit flow connectors, e.g., EW-06361-61; Cole-Parmer, installed on the two ends. In at least one embodiment of the present disclosure, an agar-gelatin slab is able to be cast surrounding the arterial model simulating the tissue surrounding the carotid artery. In at least one embodiment of the present disclosure, the effective length of the arterial model is 180 mm.

In at least one embodiment of the present disclosure, the piston-based pulsatile pump is able to drive BMF simulating cardiac contractions with a stroke volume of 14 ml at 60 beats per minute heart rate. In at least one embodiment of the present disclosure, the output systole and diastole phase ratio are able to be set to 25% over 75% to mimic the flow profile in the CCA. In at least one embodiment of the present disclosure, the external reservoir is able to be positioned on a adjustable height device, e.g., lab jack, allowing manometric height adjustments to create an 80-mmHg diastolic pressure during operations. In at least one embodiment of the present disclosure, the inline pressure gauge is able to be attached to the distal ends of the arterial model to measure the changes in the intraluminal pressure due to the propagating of the pulsatile pulse wave, and is able to be recorded with a digital oscilloscope, e.g., Rigol DS1104Z Plus. In at least one embodiment of the present disclosure, a 0.15 mmHg·min/mL flow resistor device corresponding to the cerebrovascular resistance is able to be added downstream in the flow circuit.

The linear ultrasound probe was held on top of the arterial model by mounting the probe to an in-house programmable linear motion stage controlled by a stepper motor, e.g., ST42H4809, Changzhou Sutai Electrical Appliance Co., Ltd, with 0.025 mm/step precision such that probe motion could be systematically introduced in the horizontal direction of the imaging view. In at least one embodiment of the present disclosure, rather than inducing motion within the model itself, motion is able to be applied to the probe. The proper alignment is confirmed by the sharp boundaries of the tissue-blood interfaces at the anterior and posterior portions of the arterial wall. During data acquisition, the probe is able to be translated linearly at a velocity of 6 mm/s from the proximal end to the distal end of the phantom. This choice of motion is in line with the unidirectional longitudinal movement of the vessel wall from late diastole to peak systole, which is relevant to PWV measurements. Correspondingly, the 6 mm/s displacement equates to a 1 mm longitudinal displacement during the systolic phase, similar to in vivo observations. Data acquisition is able to be performed for 1 s, triggered by the synchronization signal from the flow pump to capture one complete cardiac cycle for each dataset. In at least one embodiment of the present disclosure, five datasets are collected. A second set of data is able to be acquired with the probe being positioned in the middle of the arterial model and with the stepper motor disabled. This set of data provides reference PWV estimations in the absence of lateral motion.

An in vivo study to establish the feasibility of the motion-resistant framework in the estimation of PWV is further described according to the present disclosure. Five healthy subjects (three males) were recruited for this trial with the age 27±4 and BMI 19±1. Data acquisition was performed with the subjects in supine, and the subjects were instructed to be at rest for 5 minutes prior to data collection. The linear ultrasound probe was positioned to obtain the sagittal view of the left CCA, approximately 2 cm inferior to the carotid bulb; the visibility of the intima-media layer was used to confirm proper alignment. At the same time, a pulse wave tonometer, e.g., 808-1019, Millar, was placed on the right CCA at the same time to record the pressure waveform. The pulse wave tonometer was connected to a pressure control unit, e.g., PCU-2000, Millar, which served as a bridged amplifier with a 1000 Hz sampling rate. The output analog signal from the pressure control unit was then converted to a digital signal of the pressure waveform. The measured pressure waveform and the trigger signal from the ultrasound scanner were simultaneously recorded in the LabChart (ADinstruments, Dunedin, New Zealand) system.

During data acquisition, subjects were asked to inhale normally, followed by expiration, and proceed with holding their breath to limit respiratory artifacts. Five seconds of data were collected which included at least seven cardiac cycles. Immediately after, the subject's brachial blood pressure was measured three times using a sphygmomanometer device, e.g., BP5450; Omron.

During data processing for PWV estimation, the acquired RF data is able to be processed offline on MATLAB or other similar application. First, delay-and-sum beamforming is able to be performed to generate the analytic image frames. Each pixel on the frame is able to be beamformed to be at 0.075 axial×0.057 lateral $mm^2$ resolution using a GPU-accelerated delay-and-sum beamformer. The resolutions are approximately ⅟12 and ⅟16 of the pulse length to improve the 2D speckle tracking accuracy, in the lateral domain. Beamforming parameters are included in Table I (above). Upon image formation, the vessel wall is able to be delineated by identifying the hyperechoic interface at the tissue-blood boundary during diastole. A total of 22 pixels are marked on the anterior and posterior walls for each set of data.

FIG. 4A is an image of arterial walls of a model having reference pixels in a search window, and FIG. 4B is an image of arterial walls (of carotid) in vivo having reference pixels in a search window, according to an embodiment of the present disclosure.

FIG. 4A and FIG. 4B show an example of the selection of these reference pixels. Motions of these 22 reference pixels are able to be tracked with 2D cross-correlation-based speckle tracking over every other ten frames (corresponding to 3.33 ms). The template blocks are able to be defined as 37×31 pixels (2.78×1.77 $mm^2$) centered upon the reference pixel, and the respective search window is 8.18×20.58 $mm^2$ (109 pixels in axial×361 pixels in lateral) for the model. In the case of the in vivo experiments, smaller template blocks (23×15 pixels; 1.73×0.86 $mm^2$) and search windows (46×45 pixels; 3.45×2.57 $mm^2$) were utilized due to relatively smaller observed displacements. Upon tracking the motion of these 22 reference pixels, a linear interpolation is able to be performed to recover the displacement field for all the pixels along the vessel wall.

In at least one embodiment of the present disclosure, the slow-time signals at the anterior and posterior walls are then able to be sampled according to the dynamically updated lateral coordinates and, in turn, compensated for the lateral motions. The range gate of the model is 2.25 mm (30 pixels), while the range gate of the in vivo datasets was set to 0.53 mm (7 pixels) due to the greater motion seen in the former. The instantaneous axial velocity is able to be derived from the slow-time signal using a lag-one autocorrelator with a 64-sample sliding window. The median axial velocity within the range gate is determined as the axial velocity for the respective corresponding lateral position to obtain the respective axial wall velocity profile. A low-pass filter (zero-phase digital filtering) with a cutoff frequency of 50 Hz is able to be applied to smooth the axial wall velocity profile. For each lateral position, the respective anterior wall velocity profile is subtracted from the respective posterior wall profile to eliminate the undulating motion while enhancing the differential signal due to arterial expansion.

Figures 5A, 5B:
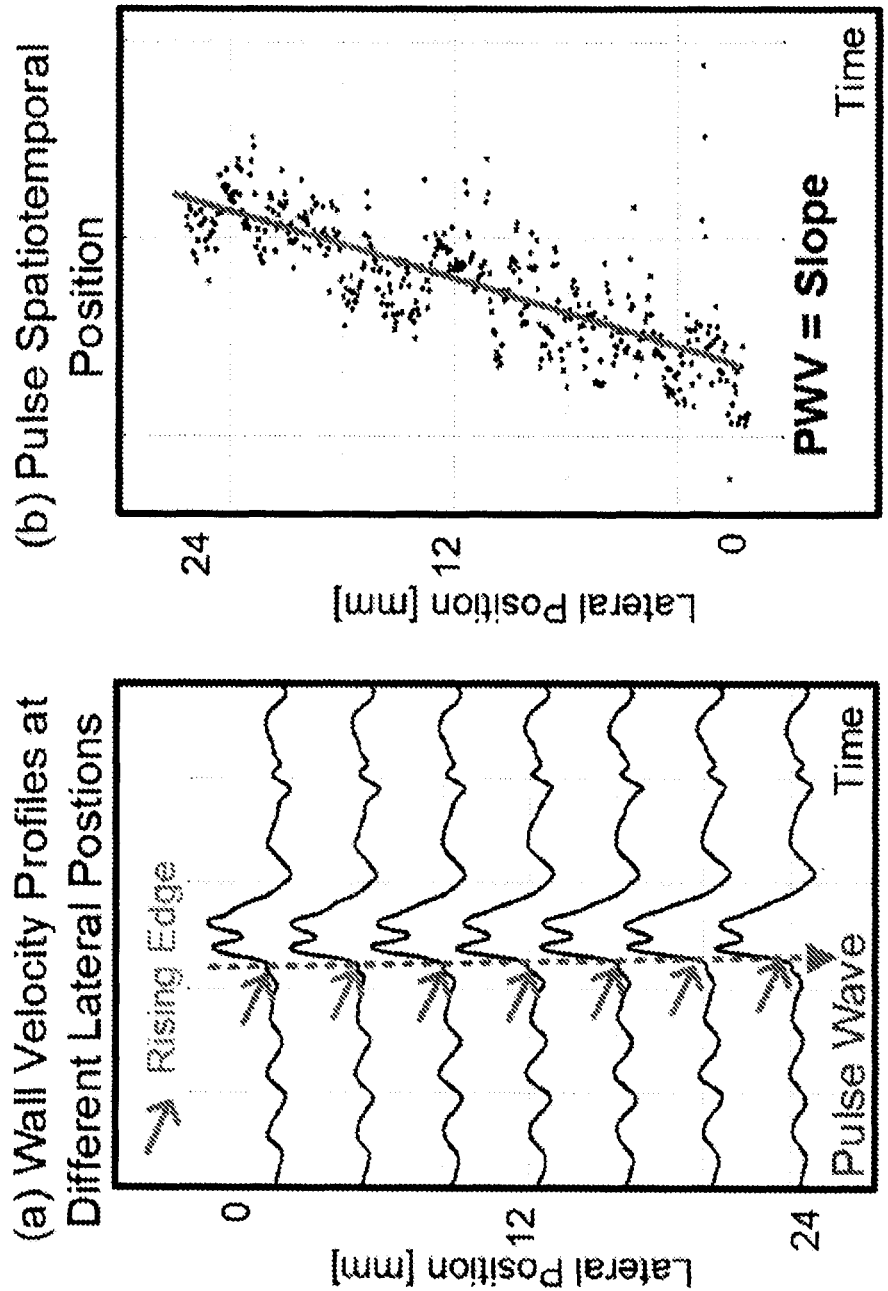
FIG. 5A is a graph of wall velocity profiles at different lateral positions according to at least one embodiment of the present disclosure.
FIG. 5B is a graph of pulse spatiotemporal positions plotted as inflection points with respect to time according to at least one embodiment of the present disclosure.

FIG. 5A is a graph of wall velocity profiles at different lateral positions, and FIG. 5B is a graph of pulse spatiotemporal positions plotted as inflection points with respect to time, according to embodiments of the present disclosure.

Lastly, the PWV is estimated from these series of axial velocity profiles. The arrival of the pulse wavefront is determined by the intersection of the extrapolated lines of the velocity curve during the early-systole phase with the end-diastole phase of the previous cardiac cycle. These two phases are able to be determined by the first-order derivative of the wall velocity profile to produce the wall acceleration curve, whereby the first peak signifies early systole while a zero-acceleration segment is indicative of late diastole. The intersection of the lines coincides with the rising edge of the travelling pulse wave (see FIG. 5A). Subsequently, the pulse wavefront's lateral positions and respective corresponding times were fitted to a linear regression to estimate its slope, which is the estimated PWV shown in FIG. 5B.

To evaluate the motion compensation to PWV estimation, the same sets of RF data (collected from in vitro and in vivo experiments) are able to be processed without applying motion compensation. For these analyses, the PWV is derived from the posterior wall due to improved visibility with less reverberation artifact. Slow-time signals are able to be sampled at the demarcated posterior vessel wall coordinates, and positions remain unchanged throughout. The slow-time signals are able to be subjected to identical Doppler processing to derive the instantaneous axial velocities. The size of the range gates is kept the same, and similarly, the velocity profiles are composed of median axial velocity within the range gate. The derived velocity profiles undergo the same treatment described previously to derive the PWV. This processing pipeline is able to be applied to the RF data collected from the model whereby the probe remained stationary, to provide a reference PWV measurement.

FIG. 6A-FIG. 6C are graphs of derivation profiles from wall velocity waveforms at the lateral position, FIG. 6A being the corrected profile, FIG. 6B being the displaced profile, and FIG. 6C being the pressure profile, according to embodiments of the present disclosure.

To further investigate the efficacy of the motion-resistant method disclosed in vivo, a comparison of the arterial pressure waveform derived from the measured wall velocity profiles to the pressure waveform obtained via tonometry is disclosed herein. The wall velocity profile at the center of the array is selected for this analysis since the tonometer is placed at a similar level on the right CCA. First, the wall displacement curve is derived by integrating the wall velocity over time. The pressure waveform is then calculated by applying a transfer function which models the exponential relationship between pressure and displacement. This process is depicted in FIG. 6A-FIG. 6C. To ensure accuracy, the pressure values for the waveform are calibrated using the brachial blood pressure measurements taken with a sphygmomanometer.

Statistical analysis is performed to compare the difference in PWV measured with and without motion compensation. For the in vitro experiments, the estimated PWV with the induced lateral motion assessed from the two approaches are respectively compared to the reference PWV (acquisition from the stationary probe setup). A paired samples t-test is able to be performed on these statistical analyses.

For the in vivo experiments, a repeated-measures t-test is performed on the PWVs collected from the five subjects to assess the statistical differences between PWVs measured with and without motion compensation. The Shapiro-Wilk normality test was applied to check the normality of the differences in PWV between the two methods. A two-sided test was used to analyze the statistical differences between the methods. Additionally, a statistical analysis comparing the similarity of the pulse waveform obtained from the ultrasound-based methods to that from tonometry is able to be performed. For this, comparison is performed on the systolic phase by analyzing pressure waveform segments between the initiation of systole to the peak pressure. The hypothesis was that the Root Mean Square Deviation (RMSD) between the tonometry and motion-resistant approach would be smaller than the RMSD between the tonometry and the method without motion compensation. A one-sided hypothesis test and the Shapiro-Wilk normality test were employed to assess the normality of the RMSD. Results are presented with p-values and box plots. The Normalized Root Mean Square Deviation (NRMSD) is able to be used to evaluate the variation in the pressure waveform between the ultrasound-based and reference methods, providing a measure of the efficacy of the motion-compensated method.

Figures 7A, 7B:
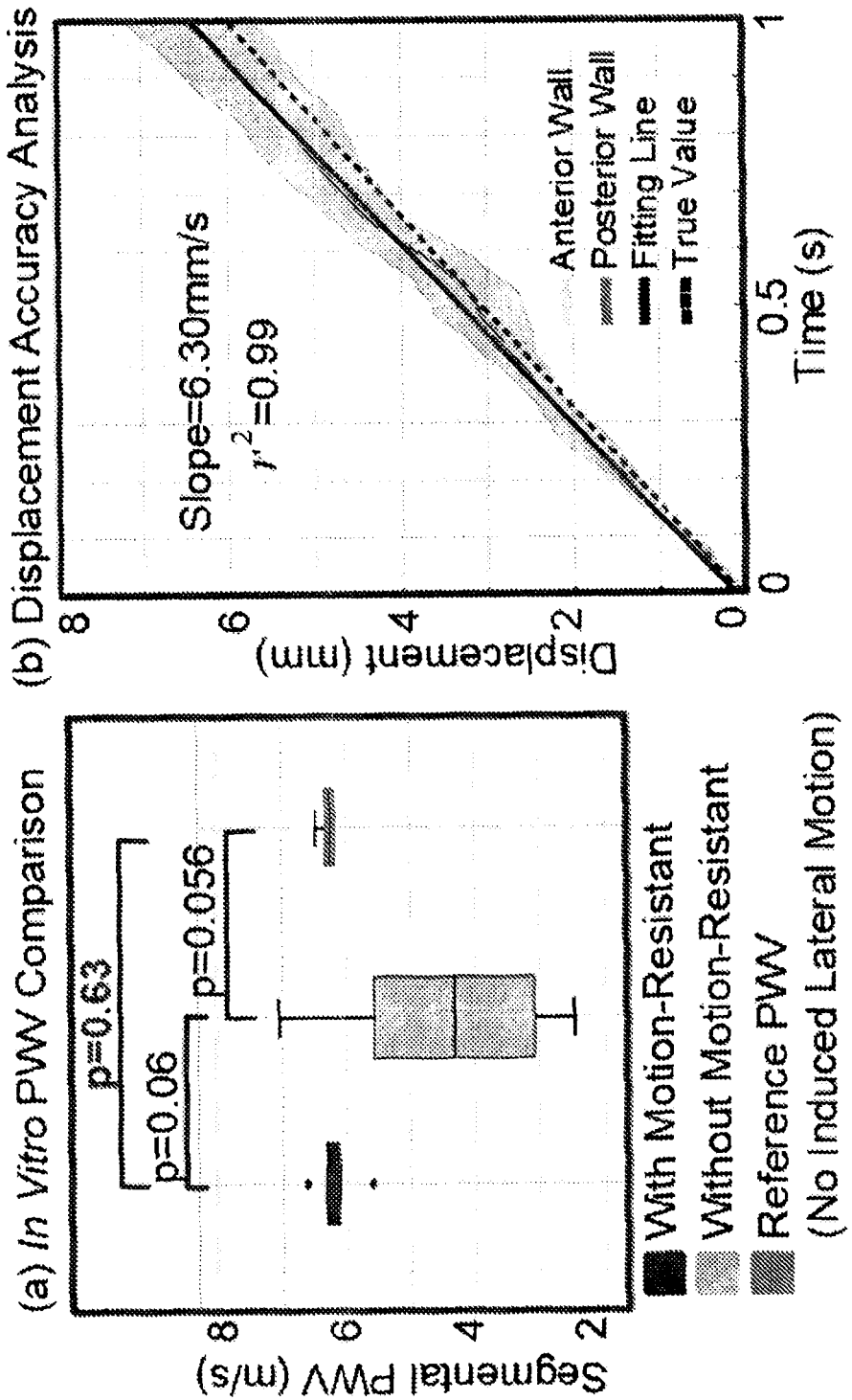
FIG. 7A is a graph comparing estimated PWVs with and without applying motion resistance according to at least one embodiment of the present disclosure.
FIG. 7B is a graph of tracked lateral displacements over time for anterior and posterior vessel walls according to at least one embodiment of the present disclosure.

FIG. 7A is a graph comparing estimated PWVs with and without applying motion resistance according to an embodiment of the present disclosure.

The motion-resistant method according to the present disclosure demonstrates the ability to effectively suppress induced lateral motions. The box-and-whisker plot in FIG. 7A depicts PWV measurements from in vitro experimental results, the estimated PWV with motion resistance was 6.19±0.33 m/s. In contrast, without motion resistance, the estimated PWV under induced lateral motion was significantly lower and more variable at 4.46±1.78 m/s. In the control experiment with no lateral motion, the estimated PWV was 6.26±0.12 m/s. Statistical analysis yielded p-values which support the above. The comparison between the motion-resistant PWV and the non-resistant PWV resulted in a p-value of 0.06, indicating statistical significance. When comparing the motion-resistant PWV to the control PWV with no lateral motion, the p-value was 0.63, indicating no significant difference. The comparison between the non-resistant PWV and the control PWV produced a p-value of 0.056, again indicating statistical significance. These results show the motion-resistant method yields PWV estimates consistent with the control condition where no lateral motion was present, suggesting the motion-resistant method effectively mitigates the impact of induced lateral motion.

FIG. 7B is a graph of tracked lateral displacements over time for anterior and posterior vessel walls according to an embodiment of the present disclosure.

The speckle-tracking algorithm's displacement of the vessel wall for 22 reference pixels in acquired datasets is able to be tracked. Over a 1-second period, the average total displacement for these pixels was 7.05±0.26 mm, compared to the programmed displacement of 6.0 mm set by the stepper motor. The average velocity for all the tracked pixels was 6.36±0.35 mm/s. FIG. 7B. plots the tracked lateral displacements versus time for all the reference pixels over the data acquisition duration. Anterior wall lateral displacements are marked in red while the posterior wall lateral displacements are marked in blue. The shaded region represents one standard deviation of the measurement. A best-fit line determines the slope, which represents the average velocity. The slope is calculated to be 6.30 mm/s with an r2 value of 0.99.

FIG. 8A is a graph comparing PWV measurement with and without motion resistance according to an embodiment of the present disclosure.

The in vivo experiment shows a statistically significant difference in the estimated PWV between measurements taken with and without motion compensation. Based on the box-and-whiskers plot in FIG. 8A, during the 5-second data acquisition period, eight cardiac cycles were recorded for four subjects, and seven cardiac cycles were recorded for the remaining subject, resulting in a total of 39 pulse waves processed and analyzed. Table II (shown below) presents the average and standard deviation of PWV measured for each subject. PWV measurements with the motion-resistant method ranged from 3.69 to 4.74 m/s (mean: 4.18±0.56 m/s), while measurements without motion resistance ranged from 1.62 to 3.59 m/s (mean: 2.54±0.94 m/s). Furthermore, the mean variance of the measurements was 0.196 with motion compensation compared to 0.611 without, indicating the motion-resistant PWV estimates are more consistent. The differences between the two measurement methods are statistically significant, as indicated by the repeated-measures t-test. Each subject showed significant differences ($p<0.05$), except for Subject 4 ($p=0.08$). Overall, the comparison between the two methods shows a statistically significant difference with a p-value less than 0.005.

TABLE II

ESTIMATED PWV DERIVED BY WITH MOTION-RESISTANT AND WITHOUT MOTION-RESISTANT FOR EACH SUBJECT

| Subject No. (Sample Number) | Systolic/Diastolic Pressure (mmHg) | With Motion-Resistant (m/s) | Without Motion-Resistant (m/s) | Paired T-test | Longitudinal Motion (mm) |
|---|---|---|---|---|---|
| 1 (N = 8) | 103/67 | 4.34 + 0.22 | 1.97 + 0.37 | p < 0.005 | 0.37 + 0.043 |
| 2 (N = 8) | 95/58 | 4.22 ± 0.41 | 3.06 ± 0.44 | p < 0.005 | 0.43 ± 0.043 |
| 3 (N = 7) | 101/60 | 3.88 ± 0.15 | 3.04 ± 0.87 | p < 0.05 | 0.43 ± 0.041 |
| 4 (N = 8) | 115/62 | 4.74 ± 0.67 | 3.59 ± 1.38 | p = 0.08 | 0.40 ± 0.059 |
| 5 (N = 8) | 101/70 | 3.69 ± 0.54 | 1.62 ± 0.25 | p < 0.005 | 0.43 ± 0.039 |
| All Data (N = 39) | — | 4.18 + 0.56 | 2.54 + 0.94 | p < 0.005 | 0.41 + 0.045 |

FIG. 8B is a map indicating lateral displacement detected along the arterial wall according to an embodiment of the present disclosure. Furthermore, the tracked longitudinal motion at the anterior and posterior walls throughout the cardiac cycle are disclosed according to the present disclosure. Table II lists the amplitude of the longitudinal displacements of the tracked pixel positions. The average amplitude of the peak-to-peak displacement ranges from 0.37 mm to 0.43 mm for the five subjects. As a further analysis, the localized peak-to-peak displacements of Subject #3 along the arterial wall were mapped, as shown in FIG. 8B.

FIG. 8C is a graph of longitudinal wall displacement at four positions of the arterial wall, according to an embodiment of the present disclosure. The graph shows the tracked longitudinal displacements over a cardiac cycle of Subject #3 in FIG. 8C at the four different positions, namely, the proximal anterior wall, the proximal posterior wall, the distal anterior wall, and the distal posterior wall. These graphs/plots shown in FIG. 8A-FIG. 8C exhibit multiphasic and bidirectional motion characteristics, each with distinct amplitudes.

FIG. 9A and FIG. 9B is a pressure wave form derived using the motion resistant framework, without motion-resistant method and reference and acquired from two respective subjects (a) and (b), according to embodiments of the present disclosure.

FIG. 9A and FIG. 9B show the pressure waveform derived from the motion-compensated axial velocity (dark green) and the non-motion-compensated axial velocity (light green), along with the pressure profile measured via tonometry (orange) recorded from Subjects #3 and #5 over three cardiac cycles. During systole, the pressure waveform derived from the motion-compensated framework accurately traces the pressure waveform measured via tonometry. Both recordings exhibit the same peak systolic pressure and reach the peak systolic point simultaneously. In contrast, the measurement without motion compensation displays an observable delay in peak systolic pressure, and its amplitude is notably lower.

FIG. 9C is a graph of RMSD of the pressure waveform from motion-resistant method versus tonometry compared to RMSD non-motion-resistant method versus tonometry, according to embodiments of the present disclosure.

To quantify the similarity between the methods, Root Mean Square Deviation (RMSD) and Normalized Root Mean Square Deviation (NRMSD) were evaluated for each subject, with the mean and standard deviation listed in Table III (see below). The RMSD values ranged from 1.93 to 4.58 for the motion-compensated method, compared to 4.62 to 9.43 for the non-motion-compensated method. Similarly, the NRMSD values were 2.53% to 5.80% for the motion-compensated method, versus 5.26% to 10.8% for the non-motion-compensated method. Overall, the RMSD for all samples using the motion-compensated method was 2.82±1.26, compared to 6.70±3.16, with a statistically significant p-value of <0.005 (FIG. 9C). These results indicate that the motion-compensated method provides a more accurate estimation of pressure waveforms consistent with tonometry measurements.

posterior walls are subtracted from each other, effectively enhancing the differential signal from the arterial expansion due to pulse waves.

The efficacy of the motion-resistant method described throughout the present disclosure with a custom in vitro experimental platform (as shown in FIG. 3) devised to simulate the common carotid artery and its expected motions in a well-characterized manner. The results demonstrate (as shown in FIG. 7A) the motion-resistant method effectively mitigates induced motions, yielding PWV estimates comparable to those measured under control conditions without induced lateral motion (6.19±0.33 m/s vs. 6.26±0.12 m/s), with an estimation difference of 1.1%. In contrast, when motion artifacts are neglected, the estimated PWV is significantly lower, e.g., at 4.46±1.78 m/s, representing a 28.8% reduction with higher variance. This underestimation is due to the longitudinal motion artifact aligning with the direction of pulse wave propagation, conflating wall motions arising from both and thereby compromising the accuracy of the PWV measurements without effective motion resistant.

The performance of the motion-tracking algorithm by analyzing the tracked displacement over a cardiac cycle, as depicted in FIG. 7B is further described according to the present disclosure. Over the 1-second period, the average tracked displacement was 7.05±0.26 mm, while the average velocity was 6.30 mm/s. The results indicate the error increases over time, suggesting the tracking accuracy suffers with increasing displacement. The displacement is accurate and consistent within the first 1 mm displacement range,

TABLE III

RMSD AND NRMSD OF THE PRESSURE WAVEFORM COMPARISON BETWEEN ULTRASOUND-BASED PWV ESTIMATION METHOD AND TONOMETER

| Subject No. (Sample Number) | Motion-Resistant Framework vs. Tonometer | | Non Motion-Resistant Method vs. Tonometry | | p-value (for RMSD) |
| --- | --- | --- | --- | --- | --- |
| | RMSD | NRMSD (%) | RMSD | NRMSD (%) | |
| 1 (N = 8) | 2.22 ± 0.62 | 2.53 ± 0.70% | 4.62 ± 0.87 | 5.26 ± 0.97% | p < 0.005 |
| 2 (N = 8) | 1.93 ± 0.64 | 2.42 ± 0.80% | 5.92 ± 2.73 | 7.34 ± 3.30% | p < 0.005 |
| 3 (N = 7) | 2.81 ± 1.39 | 3.37 ± 1.78% | 6.54 ± 3.23 | 7.70 ± 3.64% | p < 0.05 |
| 4 (N = 8) | 2.58 ± 0.78 | 2.85 ± 0.83% | 6.98 ± 3.09 | 7.66 ± 3.39% | p < 0.005 |
| 5 (N = 8) | 4.55 ± 0.85 | 5.18 ± 0.87% | 9.43 ± 3.64 | 10.8 ± 4.80% | p < 0.05 |
| All Data | 2.82 ± 1.26 | — | 6.70 ± 3.16 | — | p < 0.005 |

Accurate segmental PWV estimation remains to be a technical challenge in the analysis of arterial wall dynamics. To overcome this challenge, a new high-frame-rate ultrasound-based motion-resistant PWV assessment framework (summarized in FIG. 1) which isolates movements originating from propagating pulse waves to enhance the reliability of PWV measurements is described according to the present disclosure. The present disclosure combines speckle tracking and tissue Doppler techniques to track, compensate, and suppress motion artifacts from extrinsic sources such as respiration and cardiac contractions, as well as intrinsic longitudinal wall motions. Leveraging the temporal resolution of high-frame-rate ultrasound, the present disclosure includes the following steps. First, longitudinal wall motions are tracked using a 2D speckle tracking algorithm which estimates inter-frame displacements of the arterial walls over successive frames and dynamically updates respective lateral positions to minimize cumulative errors (as shown in FIG. 2). Second, undulating arterial motions are suppressed via a common-mode rejection scheme (as shown in FIG. 1, Step 3), where the axial wall velocities of the anterior and which is sufficient to track the physiological longitudinal wall motions in the range of 0.4 mm. Additionally, the reliability of motion tracking is indifferent between the anterior and posterior walls. When analyzing the velocities separately through linear fitting, the average velocity by tracking the anterior wall was 6.33 mm/s, while the average velocity by tracking the posterior wall was 6.23 mm/s.

In the in vivo study involving human volunteers the findings from the in vivo experiment indicated a statistically significant difference in estimated PWV between measurements taken with and without motion compensation (as shown in FIG. 8A), with mean PWV values of 4.18±0.56 m/s and 2.54±0.94 m/s, respectively. The 39.2% lower estimates observed without motion compensation are consistent with in vitro experiments, suggesting that unaccounted longitudinal motion is able to lead to significant underestimation of PWV. Further analysis of the tracked longitudinal displacement of the artery during a cardiac cycle revealed bidirectional motion with an average amplitude of 0.4 mm. Furthermore, the amplitude of the longitudinal displacement along the artery was mapped to assess the spatial variance of the movement characteristics for further analysis. The results of the amplitude of longitudinal displacement varied along the length of the artery, indicating spatial inconsistency in the movement characteristics. This inconsistency emphasizes the complexity of arterial motion and the importance of precise motion compensation techniques across segments of the artery to ensure accurate PWV measurements.

In the in vivo experiment, the absence of a ground truth incorporated correlation of measurements with an alternative reference method. To this end, the pressure waveform was able to be derived from the measured axial velocity motion and correlated with the pressure waveform recorded via tonometry. The pressure waveform derived from the motion-resistant method described throughout the present disclosure accurately traces the reference pressure waveform (FIG. 9A-FIG. 9C), with both recording the same peak systolic pressure and reaching the peak systolic point simultaneously. In contrast, measurements without motion compensation exhibited an observable delay in peak systolic pressure and a notably lower amplitude, underscoring the importance of effective motion compensation.

The present disclosure produces accurate pulse waveforms, comparable to those obtained via tonometry. Such an advantage is able to be leveraged to further develop applications for wave intensity analysis or wave separation analysis. Both wave intensity analysis and wave separation analysis are associated with the quantification of the reflected pulse wave, caused by downstream impedance mismatch. The reflected pulse wave is able to be extracted from the pulse waveform, which is conflated with the forward pulse wave and the reflected pulse wave. The intensity and timing of the return of the reflected wave provide insights into arterial functions as the reflected wave is affected by increased arterial stiffness and cardiovascular risk factors. Since the wave separation procedures utilize the derived pulse waveform consistent pulse waveforms are able to increase the reliability of the separated reflected wave profile, providing a more accurate interpretation of vascular health through the derived reflected pulse wave profiles.

The complexity of arterial dynamics impedes accurate PWV estimation, necessitating advanced methods as described throughout the present disclosure to isolate wall motion profiles specific to pulse wave propagation. The presented high-frame-rate ultrasound-based PWV estimation framework effectively mitigates the impact of longitudinal and oscillatory tissue motions, enabling a more accurate and reliable estimation of PWV. This advancement holds significant clinical potential for improving the assessment of arterial stiffness and enhancing cardiovascular disease risk stratification.

Additionally, those having ordinary skill in the art readily recognize that the techniques described above can be utilized in a variety of devices, environments, and situations. Although the embodiments have been described in language specific to structural features or methodological acts, the subject matter defined in the appended claims is not necessarily limited to the specific features or acts described. Rather, the specific features and acts are disclosed as exemplary forms of implementing the claims.

What is claimed is:

1. A method of measuring pulse wave velocity ("PWV") in an arterial wall of a blood vessel utilizing ultrasound imaging, comprising:
    placing of an ultrasound probe on an exterior tissue above the blood vessel;
    transmitting ultrasound pulses at high frame rates of over 100 Hz from the ultrasound probe into the tissue, and receiving echo signals containing the pressure wave motion on the blood vessel wall;
    tracking of longitudinal motion of the arterial wall as the pressure/pulse wave transits through the arterial wall;
    suppressing of longitudinal wall movement and undulating motion of the arterial wall on successive beamformed image frames of the arterial wall while extracting displacement information of the arterial wall; and
    enhancing of a wall expansion signal/differential signal of the arterial wall due to the pressure/pulse wave.

2. The method of measuring PWV in the arterial wall according to claim 1, wherein the tracking comprises mapping pixel coordinates on the successive beamformed image frames of the arterial wall, with the pixel coordinates having a reference point/kernel centered thereon.

3. The method of measuring PWV in the arterial wall according to claim 2, wherein the pixel coordinates have a respective wall displacement in lateral and axial directions on the successive beamformed image frames, and
    the respective wall displacements are tracked by a 2D cross-correlation-based speckle tracking algorithm based on the reference point/kernel on the successive beamformed image frames to obtain wall displacement estimates of unsampled pixel coordinates.

4. The method of measuring PWV in the arterial wall according to claim 3, wherein the method further comprises resampling of slow-time signals/motion compensation via dynamic slow-time signal sampling of every wall position for which the longitudinal wall displacement is compensated; and
    estimation of local axial wall velocities using a phase-based estimator as applied to every dynamically sampled vessel wall slow-time signal.

5. The method of measuring PWV in the arterial wall according to claim 4, wherein the suppressing further comprises suppressing of undulating motion of the arterial wall by performing a common-mode rejection scheme on the axial wall velocities along the blood vessel.

6. The method of measuring PWV in the arterial wall according to claim 1, wherein the tracking is of multiphasic and bidirectional longitudinal displacements of anterior and posterior walls of the arterial wall during a cardiac cycle.

* * * * *